(12) United States Patent  
McGrath et al.

(10) Patent No.: US 9,330,102 B2  
(45) Date of Patent: *May 3, 2016

(54) MULTI-TENANT PLATFORM-AS-A-SERVICE (PAAS) SYSTEM IMPLEMENTED IN A CLOUD COMPUTING ENVIRONMENT

(71) Applicant: Red Hat, Inc., Raleigh, NC (US)

(72) Inventors: Michael P. McGrath, Schaumburg, IL (US); Matthew Hicks, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/474,694

(22) Filed: Sep. 2, 2014

(65) Prior Publication Data

US 2014/0373109 A1    Dec. 18, 2014

Related U.S. Application Data

(63) Continuation of application No. 13/461,584, filed on May 1, 2012, now Pat. No. 8,850,514.

(51) Int. Cl.
| | |
|---|---|
| *G06F 21/00* | (2013.01) |
| *G06F 17/30* | (2006.01) |
| *G06F 9/455* | (2006.01) |
| *G06F 21/53* | (2013.01) |
| *H04L 29/06* | (2006.01) |

(52) U.S. Cl.
CPC .......... *G06F 17/30076* (2013.01); *G06F 9/455* (2013.01); *G06F 17/30091* (2013.01); *G06F 21/53* (2013.01); *H04L 63/10* (2013.01)

(58) Field of Classification Search
USPC .......................................................... 726/1
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 | 1/2013 | Kwok et al. | |
| 8,505,006 B1 | 8/2013 | Larkin et al. | |

(Continued)

OTHER PUBLICATIONS

USPTO, Office Action for U.S. Appl. No. 13/461,705 (L949) mailed Jan. 30, 2014.

(Continued)

*Primary Examiner* — Tu Nguyen  
(74) *Attorney, Agent, or Firm* — Lowenstein Sandler LLP (57) ABSTRACT

Implementations for providing cartridges in a multi-tenant PaaS system of a cloud computing environment is disclosed. An example method includes maintaining a repository of a plurality of packages that provide functionality for multi-tenant applications executed by a node, each package of the plurality of packages comprising a software and a configuration information specifying a plurality of hooks, receiving a request to configure a first package from the plurality of packages, wherein the first package is to provide functionality for one of the multi-tenant applications, establishing a container to provide process space for the functionality of the first package, calling a configure hook from the plurality of hooks specified in the configuration information of the first package, and in response to calling the configure hook, embedding an instance of the software of the first package in the container, the instance of the software of the first package copied from the repository.

20 Claims, 7 Drawing Sheets

(56) References Cited

U.S. PATENT DOCUMENTS

| | | | |
|---|---|---|---|
| 8,635,351 B2 | 1/2014 | Astete et al. | |
| 2002/0087958 A1 | 7/2002 | Krause | |
| 2002/0091753 A1 | 7/2002 | Reddy et al. | |
| 2005/0160428 A1 | 7/2005 | Ayachitula et al. | |
| 2006/0277305 A1 | 12/2006 | Bernardin et al. | |
| 2007/0128899 A1 | 6/2007 | Mayer | |
| 2007/0203999 A1* | 8/2007 | Townsley | H04L 29/1282 709/207 |
| 2008/0028071 A1 | 1/2008 | Miyajima | |
| 2008/0036488 A1 | 2/2008 | Kelem | |
| 2008/0163004 A1 | 7/2008 | Yu | |
| 2008/0313639 A1 | 12/2008 | Kumar et al. | |
| 2008/0320474 A1 | 12/2008 | Jelinek et al. | |
| 2009/0024609 A1 | 1/2009 | Barker et al. | |
| 2009/0313374 A1 | 12/2009 | Murphy et al. | |
| 2009/0313620 A1 | 12/2009 | Sedukhin et al. | |
| 2010/0122343 A1 | 5/2010 | Ghosh et al. | |
| 2010/0153951 A1 | 6/2010 | Jones | |
| 2010/0262467 A1* | 10/2010 | Barnhill, Jr. | H04L 12/2809 709/223 |
| 2010/0275241 A1 | 10/2010 | Srinivasan | |
| 2011/0055310 A1 | 3/2011 | Shavlik et al. | |
| 2011/0083131 A1 | 4/2011 | Pirzada et al. | |
| 2011/0246617 A1 | 10/2011 | Sheehan et al. | |
| 2011/0252320 A1 | 10/2011 | Arrasvuori et al. | |
| 2011/0276584 A1 | 11/2011 | Cotner et al. | |
| 2011/0277027 A1 | 11/2011 | Hayton et al. | |
| 2011/0302415 A1 | 12/2011 | Ahmad et al. | |
| 2012/0004041 A1 | 1/2012 | Pereira et al. | |
| 2012/0011077 A1 | 1/2012 | Bhagat | |
| 2012/0096165 A1 | 4/2012 | Madduri et al. | |
| 2012/0173581 A1 | 7/2012 | Hartig et al. | |
| 2012/0174099 A1 | 7/2012 | Ashok et al. | |
| 2012/0185913 A1 | 7/2012 | Martinez et al. | |
| 2012/0215919 A1 | 8/2012 | Labat et al. | |
| 2012/0246740 A1 | 9/2012 | Brooker et al. | |
| 2013/0005487 A1 | 1/2013 | Frazzini et al. | |
| 2013/0007239 A1 | 1/2013 | Agarwal et al. | |
| 2013/0019243 A1 | 1/2013 | Schmidt et al. | |
| 2013/0036208 A1 | 2/2013 | Dochez | |
| 2013/0055243 A1 | 2/2013 | Dandekar et al. | |
| 2013/0227560 A1 | 8/2013 | McGrath et al. | |
| 2013/0227561 A1 | 8/2013 | Walsh et al. | |
| 2013/0227563 A1 | 8/2013 | McGrath et al. | |
| 2013/0227635 A1 | 8/2013 | Walsh et al. | |
| 2013/0297672 A1 | 11/2013 | McGrath et al. | |
| 2013/0297673 A1 | 11/2013 | McGrath et al. | |
| 2013/0297685 A1 | 11/2013 | McGrath et al. | |
| 2013/0297795 A1 | 11/2013 | McGrath et al. | |
| 2013/0298183 A1 | 11/2013 | McGrath et al. | |
| 2013/0305243 A1 | 11/2013 | Hiki | |
| 2014/0040883 A1 | 2/2014 | Tompkins | |

OTHER PUBLICATIONS

USPTO, Final Office Action for U.S. Appl. No. 13/461,705 (L949) mailed Aug. 7, 2014.
USPTO, Office Action for U.S. Appl. No. 13/408,001 (L951) mailed Jul. 16, 2014.
USPTO, Office Action for U.S. Appl. No. 13/408,754 (L1381) mailed Jan. 16, 2014.
USTPO, Final Office Action for U.S. Appl. No. 13/408,754 (L1381) mailed Jun. 4, 2014.
USPTO, Advisory Action for U.S. Appl. No. 13/408,754 (L1381) mailed Aug. 11, 2014.
USPTO, Notice of Allowance for U.S. Appl. No. 13/461,584 (L1384) mailed Jan. 29, 2014.
USPTO, Notice of Allowance for U.S. Appl. No. 13/461,584 (L1384) mailed May 22, 2014.
USPTO, Office Action for U.S. Appl. No. 13/408,729 (L1385) mailed Mar. 12, 2014.
USPTO, Office Action for U.S. Appl. No. 13/461,715 (L1413) mailed Jul. 23, 2014.
USPTO, Office Action for U.S. Appl. No. 13/408,676 (L1414) mailed Feb. 27, 2014.
The Authoritative Dictionary of IEEE Standards Terms. 2000, Standards Information Network IEEE Press. seventh edition. p. 131 and 530.
Linux man page pam_namespace; htt://web.archive.org/web/20081014010639/http://linux.die.net/man/8/pam_nampespace; Oct. 14, 2008.
Loscocco et al. Meeting Critical Security Objectives with Security-Enhanced Linux. 2001. NSA. pp. 1-11.
Morris, James. File System Labeling in SELinux. 2004. RedHat. pp. 1-8.
Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.
Smalley, Stephen D. SELinux. 2001.NSA. pp. 1-23.
Unix man unshare clone Janak Desai, Jan. 11, 2006; p. 1-5.
Wiki LXC; http://web.archive.org/web/20120130164103/http://en.wikipedia.org/wiki/LXC; Jan. 30, 2012.
Maoke Chen and Akihiro Nakao, "Feather-Weight Network Namespace Isolation Baased on User-Specific Addressing and Routing in Commodity OS," T. Magedanz et al. (EDS.): TridentCom 2010, LNICST 46, pp. 53-68, 2011.
An Quin et al., "Xconveryer: Guarantee Hadoop Throughput via Lightweight OS-level Virtualization," 2009 Eighth International Conference on Grid and Cooperative Computing, IEEE 2009, pp. 299-304.
Anup K. Ghosh and Angelos Stavrou, "DARPA Mobivisor: An Architecture for High Assurance for Untrusted Applications on Wireless Handheld Devices Via Lightweight Virtualization," Nov. 2010, 28 pages.
Corcoran et al. Cross-Tier, Label-based Secuirty Enforcement for Web Applications. 2009. ACM. pp. 269-281.
USPTO, Notice of Allowance for U.S. Appl. No. 13/461,705 (L949), mailed Nov. 7, 2014.
USPTO, Notice of Allowance for U.S. Appl. No. 13/461,705 (L949), mailed Sep. 22, 2015.
USPTO, Notice of Allowance for U.S. Appl. No. 13/408,001 (L951), mailed Feb. 18, 2015.
USPTO, Office Action for U.S. Appl. No. 13/408,754 (L1381), mailed Jul. 13, 2015.
USPTO, Final Office Action for U.S. Appl. No. 13/408,754 (L1381), mailed Nov. 18, 2015.
USPTO, Notice of Allowance for U.S. Appl. No. 13/408,729 (L1385), mailed Sep. 29, 2014.
USPTO, Notice of Allowance for U.S. Appl. No. 13/408,729 (L1385), mailed Jan. 22, 2015.
USPTO, Final Office Action for U.S. Appl. No. 13/461,715 (L1413), mailed Feb. 10, 2015.
USPTO, Advisory Action for U.S. Appl. No. 13/461,715 (L1413), mailed Apr. 30, 2015.
USPTO, Office Action for U.S. Appl. No. 13/461,715 (L1413), mailed Sep. 24, 2015.
USPTO, Notice of Allowance for U.S. Appl. No. 13/408,676 (L1414), mailed Oct. 7, 2014.
USPTO, Notice of Allowance for U.S. Appl. No. 13/408,676 (L1414), mailed Jan. 23, 2015.
Authors et al., "Apparatus and Method of Tenant Context Generation and Propagation in SaaS Environment," Aug. 19, 2010, IP.com. pp. 1-4.

* cited by examiner

MULTI-TENANT PLATFORM-AS-A-SERVICE (PAAS) SYSTEM IMPLEMENTED IN A CLOUD COMPUTING ENVIRONMENT

REFERENCE TO RELATED APPLICATION

This application is a continuation of U.S. patent application Ser. No. 13/461,584, filed on May 1, 2012, the entirety of which is incorporated herein by reference.

TECHNICAL FIELD

The embodiments of the invention relate generally to platform-as-a-service (PaaS) environments and, more specifically, relate to cartridges in a multi-tenant PaaS system implemented in a cloud computing environment.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system. Customers that have installed and are executing their programs "in the cloud" typically communicate with the executing program from remote geographic locations using Internet protocols.

For programs that are web applications, the additional software can further include such software components as middleware and a framework. Web applications are programs that receive and act on requests in web or other Internet protocols, such as Hypertext Transfer Protocol (HTTP). It is common for a user to use a web application by using a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically must identify all of the software components that a web application needs in order to execute, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested to execute the web application instead or in addition on a different hypervisor and/or in a different particular provider's cloud. Also, it can be difficult to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings. PaaS offerings typically facilitate deployment of applications without the cost and complexity of buying and managing the underlying hardware and software and provisioning hosting capabilities, providing all of the facilities required to support the complete life cycle of building and delivering web application and service entirely available from the Internet. Typically, these facilities operate as one or more virtual machines (VMs) running on top of a hypervisor in a host server.

In present PaaS offerings, customers' deployed applications can differ widely in terms of the functionality and protocols relied on. For example, one customer may rely on a JBoss™ runtime environment, while another customer may rely on an Apache web server environment with a Ruby runtime language. Current PaaS systems offer support for various different functionalities and protocols that are necessary to run applications. These functionalities and protocols are provided without requiring the customer to administer or update the included feature. However, the current PaaS systems have not provided a solution for providing the various different functionalities and protocols in a multi-tenant environment with a different customers consuming different functionalities and protocols while running on the same node.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide for cartridges in a multi-tenant PaaS system implemented in a cloud computing environment. A method of embodiments of the invention includes maintaining, by a virtual machine (VM) executing on a computing device, a cartridge library comprising cartridge packages that provide functionality for multi-tenant applications executed by the VM, receiving a request to configure a cartridge on the VM, wherein the cartridge provides functionality for a multi-tenant application executed by the VM, establishing a container to provide process space for the functionality of the cartridge, calling a configure hook for a type of the cartridge, and in response to calling the configure hook, embedding an instance of the cartridge in the container, the instance of the cartridge obtained from a cartridge package of the cartridge library.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing", "applying", "identifying", "configuring", "establishing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide for cartridges in a multi-tenant PaaS system implemented in a cloud computing environment. In the multi-tenant PaaS environment, each node (e.g., virtual machine (VM)) in the PaaS environment runs multiple applications. Embodiments of the invention provide for configuring each node (e.g., VM) in the multi-tenant PaaS system to utilize a cartridge library as the source for specific application functionality for each application running on the node. Each node includes a cartridge library containing all currently available cartridges provided by the PaaS platform (e.g., JBoss™, Apache™, PHP™, Perl™, Python™, Ruby™, Jenkins™, MySQL™, Mongo™, etc.). As applications are created on the node, these applications may embed an instance of one or more cartridges from the cartridge library to provide desired functionality for the application. Different applications/containers on the node may embed different cartridge instances, depending on the function of the application. In addition, each application container is created to support multiple networking ports for the potential cartridge instances that may be embedded in the application container—e.g., Hypertext Transfer Protocol/Hypertext Transfer Protocol Secure (HTTP/HTTPS) port, Secure Shell (SSH) port, and a custom port.

Figure 1:
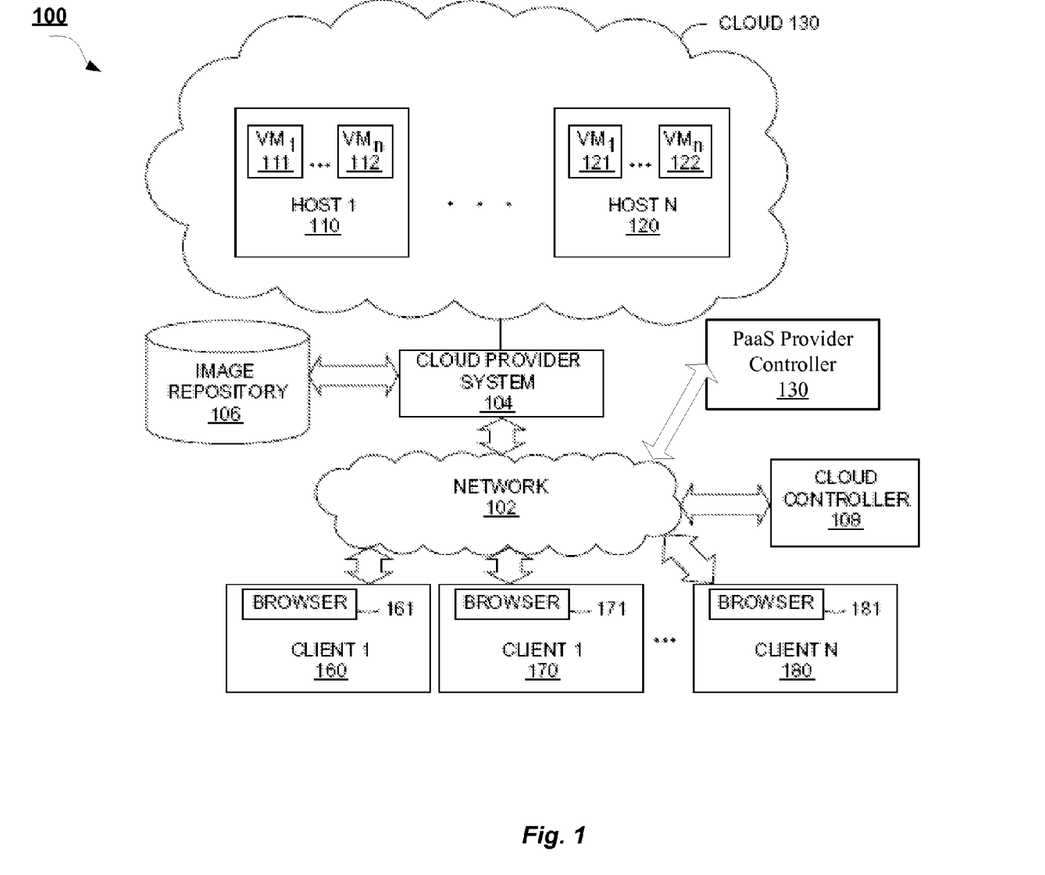
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud 130 provides VMs, such as VMs 111, 112, 121, and 122. Each VM is hosted on a physical machine, such as host 1 110 through host N 120, configured as part of the cloud 130. In some embodiments, the host machines 110, 120 are often located in a data center. For example, VMs 111 and 112 are hosted on physical machine 110 in cloud 130 provided by cloud provider 104. Users can interact with applications executing on the cloud-based VMs 112, 112, 121, 122 using client computer systems, such as clients 160, 170 and 180, via corresponding web browser applications 161, 171 and 181.

Clients 160, 170 and 180 are connected to hosts 110, 120 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of applications in the cloud 130. In some embodiments, cloud controller 108 receives commands from PaaS provider controller 130. Based on these commands, the cloud controller 108 provides data (e.g., such as pre-generated images) associated with different applications to the cloud provider system 104. In some embodiments, the data may be provided to the cloud provider 104 and stored in an image repository 106, in an image repository (not shown) located on each host 110, 120, or in an image repository (not shown) located on each VM 111, 112, 121, 122.

Upon receiving a command identifying specific data (e.g., application data and files used to initialize an application on the cloud), the cloud provider 104 retrieves the corresponding data from the image repository 106, creates an instance of it, and loads it to the host 110, 120 to run on top of a hypervisor (not shown) as a VM 111, 112, 121, 122 or within a VM 111, 112, 121, 122. In addition, a command may identify specific data to be executed on one or more of the VMs 111, 112, 121, 122. The command may be received from the cloud controller 108, from a PaaS Provider Controller 130, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based disks, solid-state drives (SSDs) or hard drives.

While various embodiments are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
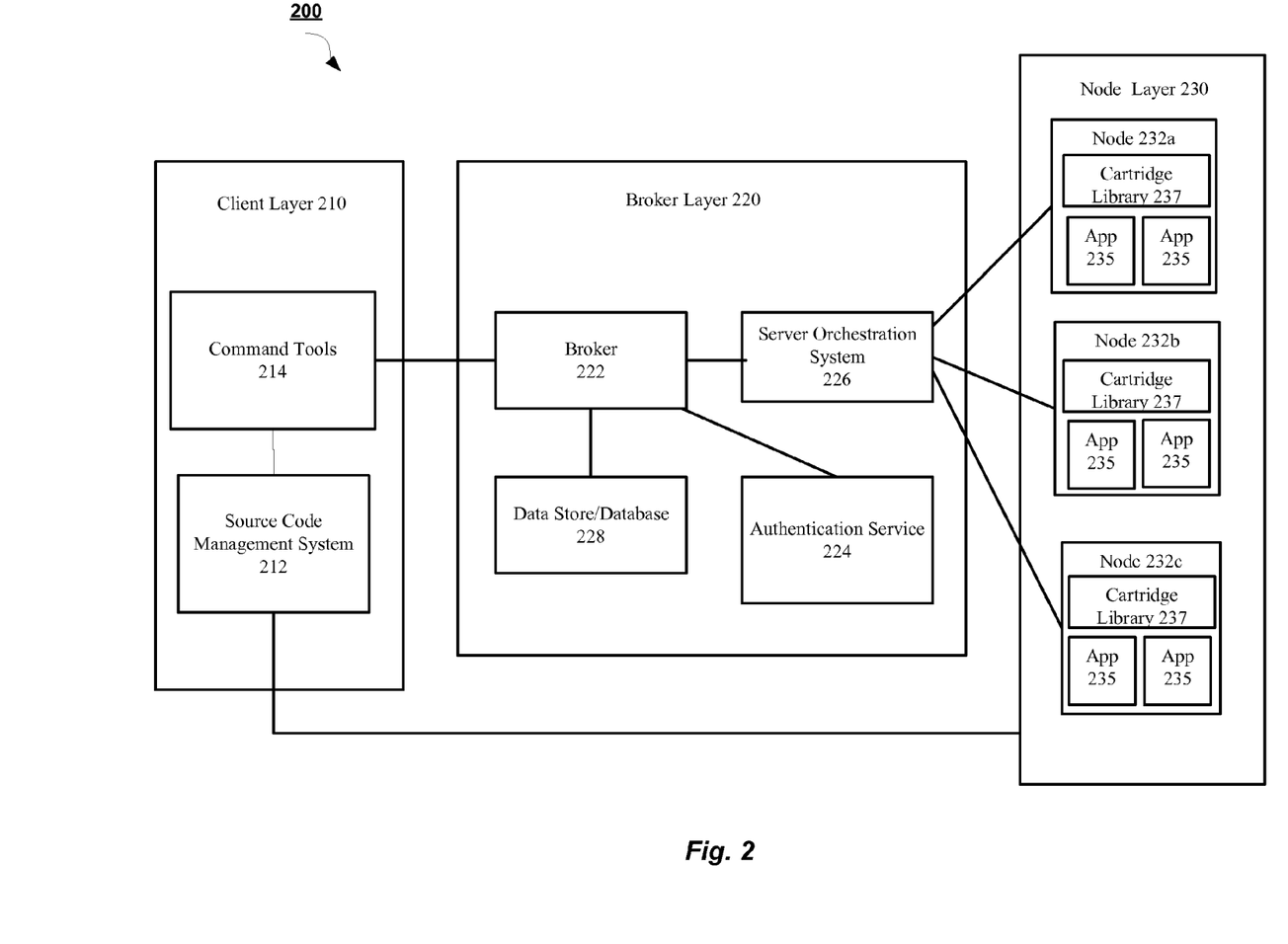
FIG. 2 is a block diagram of a PaaS system architecture according to an embodiment of the invention.

FIG. 2 is a block diagram of a PaaS system architecture 200. The PaaS architecture 200 allows users to launch software applications in a cloud computing environment, such as cloud computing environment provided in network architecture 100 described with respect to FIG. 1. The PaaS system architecture 200, in one embodiment, includes a client layer 210, a broker layer 220, and a node layer 230.

In one embodiment, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one embodiment, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can utilize to create, launch, and manage applications. In one embodiment, the command tools 214 can be downloaded and installed on the user's client machine, and can be accessed via a command line interface or a graphical user interface, or some other type of interface. In one embodiment, the command tools 214 expose an application programming interface ("API") of the broker layer 220 and perform other applications management tasks in an automated fashion using other interfaces, as will be described in more detail further below in accordance with some embodiments.

In one embodiment, the broker layer 220 acts as middleware between the client layer 210 and the node layer 230. The node layer 230 includes the nodes 232 on which software applications 235 are provisioned and executed. In one embodiment, each node 232 is a VM provisioned by an Infrastructure as a Service (IaaS) provider, such as Amazon™ Web Services. In other embodiments, the nodes 232 may be physical machines or VMs residing on a single physical machine. In one embodiment, the broker layer 220 is implemented on one or more machines, such as server computers, desktop computers, etc. In some embodiments, the broker layer 220 may be implemented on one or more machines separate from machines implementing each of the client layer 210 and the node layer 230, or may implemented together with the client layer 210 and/or the node layer 230 on one or more machines, or some combination of the above.

In one embodiment, the broker layer 220 includes a broker 222 that coordinates requests from the client layer 210 with actions to be performed at the node layer 230. One such request is new application creation. In one embodiment, when a user, using the command tools 214 at client layer 210, requests the creation of a new application 235, or some other action to manage the application 235, the broker 222 first authenticates the user using an authentication service 224. In one embodiment, the authentication service may comprise Streamline™, or may comprise some other authentication tool. Once the user has been authenticated and allowed access to the system by authentication service 224, the broker 222 uses a server orchestration system 226 to collect information and configuration information about the nodes 232.

In one embodiment, the broker 222 uses the Marionette Collective™ ("MCollective™") framework available from Puppet Labs™ as the server orchestration system 226, but other server orchestration systems may also be used. The server orchestration system 226, in one embodiment, functions to coordinate server-client interaction between multiple (sometimes a large number of) servers. In one embodiment, the servers being orchestrated are nodes 232, which are acting as application servers and web servers.

For example, if the broker 222 wanted to shut down all applications 235 on all even numbered nodes out of 100,000 nodes, the broker 222 would only need to provide one command to the server orchestration system 226. Then, the server orchestration system 226 would generate a separate message to all nodes 232 to shut down all applications 235 if the node 232 is even, and distribute the messages to the nodes 232 using a messaging and queuing system. Thus, in one embodiment, the broker 222 manages the business logic and model representing the nodes 232 and the applications 235 residing on the nodes, and acts as a controller that generates the actions requested by users via an API of the client tools 214. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally-hosted database or file store, or it can be a cloud based storage service provided by a Storage-as-a-Service (SaaS) storage provider, such as Amazon™ S3™ (Simple Storage Service). The broker 222 uses the information about the nodes 232 and their applications 235 to model the application hosting service and to maintain records about the nodes. In one embodiment, node 232 data is stored in the form of a JavaScript Object Notation (JSON) blob or string that maintains key-value pairs to associate a unique identifier, a hostname, a list of applications, and other such attributes with the node.

In embodiments of the invention, the PaaS system architecture 200 of FIG. 2 is a multi-tenant PaaS environment. In a multi-tenant PaaS environment, each node 232 runs multiple applications 235 that may be owned or managed by different users and/or organizations. As such, a first customer's deployed applications 235 may co-exist with any other customer's deployed applications on the same node 232 (VM) that is hosting the first customer's deployed applications 235.

In addition, each node also maintains a cartridge library 237. The cartridge library 237 maintains multiple software components (referred to herein as cartridges) that may be utilized by applications 235 deployed on node 232. A cartridge can represent a form of support software providing the functionality needed to run an application 235. In one embodiment, the cartridges are maintained that support languages such as JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, and cron scheduler, for example. Adding an instance of a cartridge from cartridge library 237 to an application 235 provides a capability for the application 235 without the customer owning the application having to administer or update the included feature.

The deployment of multiple applications 235 of multiple customers on a single node 232 (VM) is a cost-efficient solution for PaaS providers. However, deploying a multi-tenant PaaS solution raises a variety of concerns, including, for example, how to efficiently deploy and share cartridges for multi-tenant applications 235 on a single node 232. Embodiments of the invention provide for deployment and sharing of cartridges on a node 232 hosting multi-tenant applications 235 by establishing a cartridge library 237 on each node 232. The cartridge library 237 acts as a source for embedding cartridge instances in containers hosted by the node 232. These cartridge instances provide functionality for multi-tenant applications of the node 232. One embodiment of the interaction between the server orchestration system 226 and a node 232 to implement cartridges for multi-tenant applications is now described in more detail with reference to FIG. 3.

Figure 3:
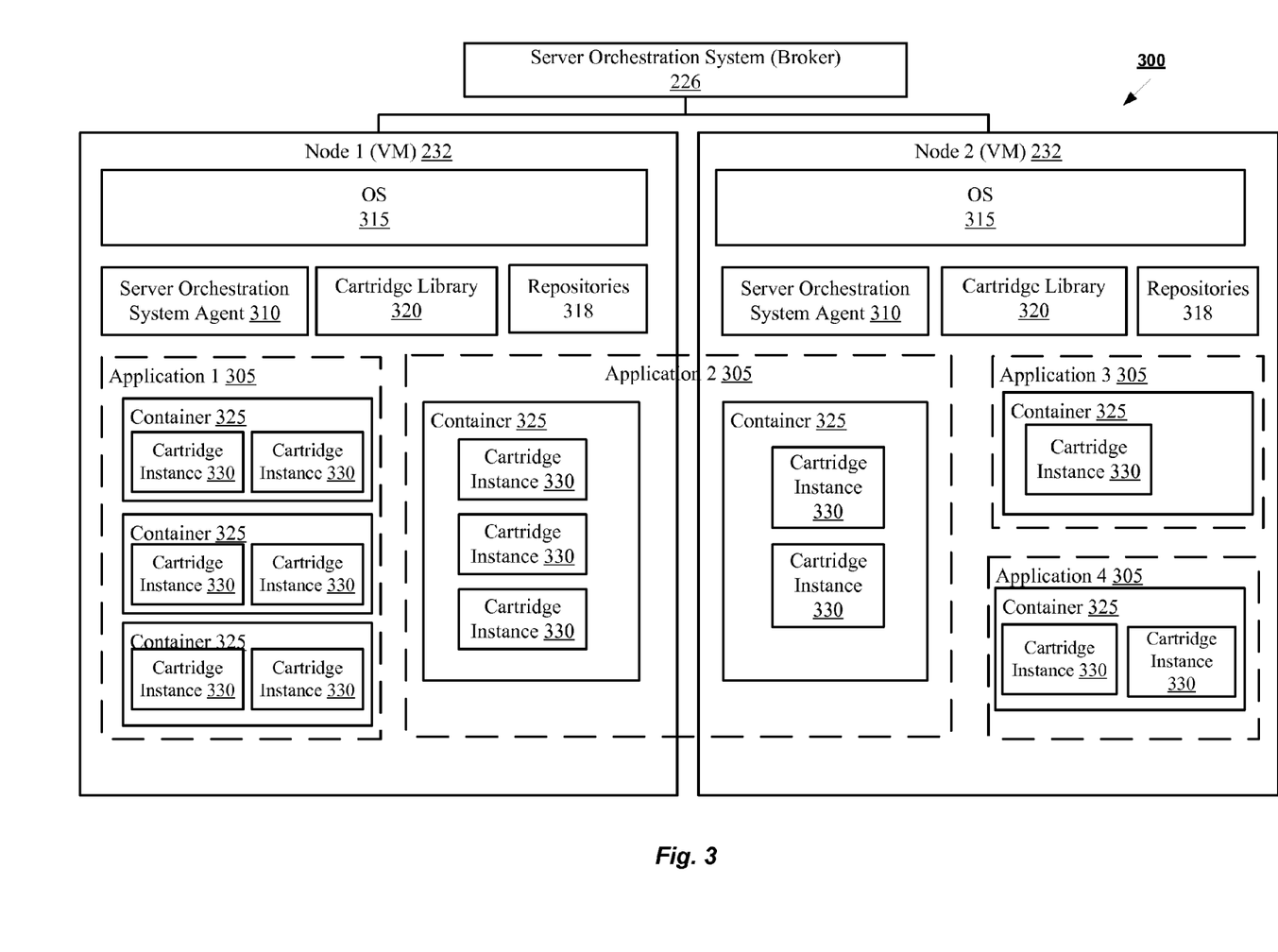
FIG. 3 is a block diagram of a communication infrastructure between a server orchestration system and a node according to embodiments of the invention.

FIG. 3 is a block diagram depicting a communication infrastructure 300 between a server orchestration system 225 and a plurality of nodes 232 according to embodiments of the invention. In one embodiment, server orchestration system 226 and nodes 232 are the same as their counterparts described with respect to FIG. 2. In one embodiment, each node 232 is implemented as a VM and has an operating system 315 that can execute applications 305 using the software repositories 318 and cartridge library 320 that are resident on the nodes 232. In one embodiment, applications 232 are the same as applications 235 described with respect to FIG. 2.

Each node 232 also includes a server orchestration system agent 310 configured to track and collect information about the node 232 and to perform actions on the node 232. Thus, in one embodiment, using MCollective™ as the server orchestration system 226, the server orchestration system agent 310 can act as a MCollective™ server. The server orchestration system 226 would then act as the MCollective™ client that can send requests, queries, and commands to the MCollective™ server on node 232.

As previously mentioned, cartridges provide the underlying support software that implements the functionality of applications 305. In one embodiment, an application 305 may utilize one or more cartridge instances 330 that are run in one or more resource-constrained containers 325 on nodes 232. Cartridge library 320 provides an OS 315-based location, outside of all application containers 325, that acts as a source for cartridge instantiations 330 that provide functionality for an application 305. An application 305 may use more than one cartridge instance 330 as part of providing functionality for the application 305. One example of this is a JavaEE application that uses a JBoss™ AS7 cartridge with a supporting MySQL™ database provided by a MySQL™ cartridge.

A container 325 is a resource-constrained process space on the node 232 to execute functionality of an application. In some embodiments, a container 325 is established by the node 232 with resource boundaries, including a limit and/or designation of the amount of memory, amount of storage, and security types and/or labels to be applied to any functions executed by the container 325. In one embodiment, containers 325 may be established using the Linux Containers (LXC) virtualization method. In some embodiments, a container 325 may also be known as a gear. In some embodiments, cartridges instances 330 for an application 305 may execute in containers 325 dispersed over more than one node 232, as shown with application 2 illustrated in FIG. 3. In other embodiments, cartridge instances 330 for an application 305 may run in one or more containers 325 on the same node 232, as shown with application 1 in FIG. 3.

In one embodiment, the server orchestration system agent 310 receives a request from the server orchestration system broker 226 to create a container 305 to run a type of cartridge that provides all or part of an application's 305 functionality. When the server orchestration system agent 310 receives the request from the broker 226, it establishes a secure container 325 associated with a unique local Unix user ID (UUID) on the node 232. In addition, the server orchestration system agent 310 establishes the resources boundaries associated with the created container 325 by creating directory and file system locations associated with the container 325 (based on a type of container the broker 226 instructed the node 232 to create) and creating a control group associated with the container 325.

Security policies for the container 325 are also established by creating and applying security labeling and types to the container 325 that fence off the container 325 from other containers 325 on the node and to prevent the container 325 from accessing the underlying system resources of the node 232. Once a secure and resource-constrained container 325 is established, the server orchestration system agent 310 invokes the cartridge library 320 in order to create a cartridge instance 330 of the type of cartridge indicated in the request from the broker 226.

Figure 4:
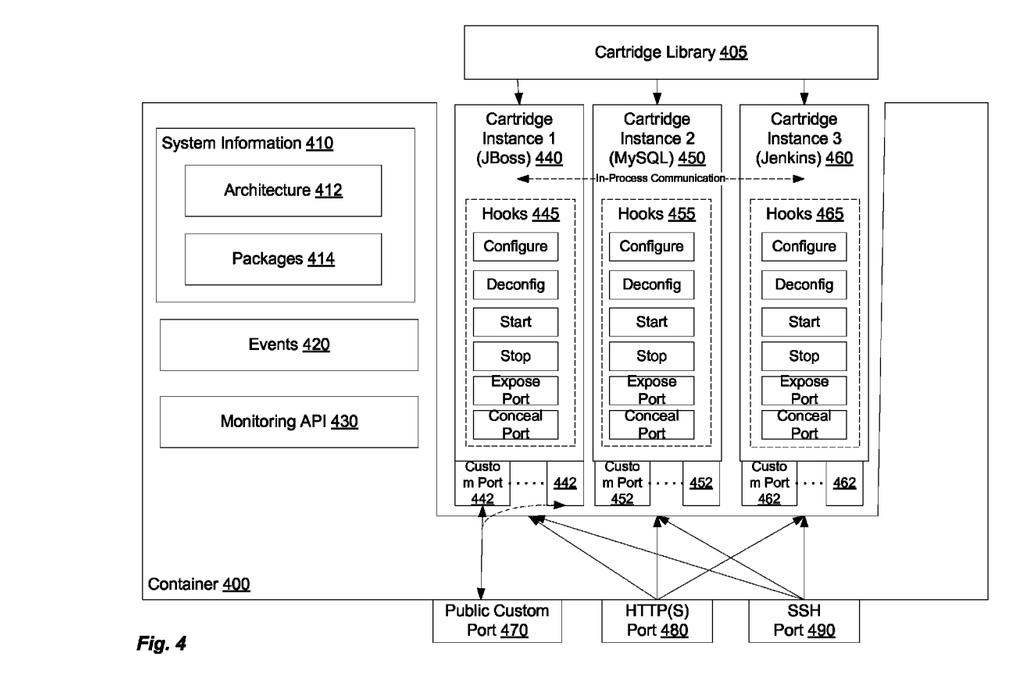
FIG. 4 is a block diagram of a container having cartridge instances that provide functionality for an application in a multi-tenant PaaS system according to embodiments of the invention.

FIG. 4 is a block diagram of a container 400 having cartridge instances that provide functionality for an application in a multi-tenant PaaS system according to embodiments of the invention. In one embodiment, container 400 is the same as container 325 implemented in node 232, as described with respect to FIG. 3. In some embodiments, an application may use more than one cartridge as part of implementing functionality for the application. As illustrated, container 400 includes multiple cartridge instances 440, 450, 460 embedded in container 400. As an example, the cartridge instances 440, 450, 460 embedded in container 400 include a JBoss™ application server (AS) cartridge instance 440, a MySQL™ cartridge instance 450, and a Jenkins™ cartridge instance 460. One skilled in the art will appreciate that embodiments of the invention are not limited to the illustrated cartridge instances and that different combinations and other cartridge instances are possible in container 400.

Cartridges and their resulting cartridge instances 440, 450, 460 are responsible for handling cartridge callouts known as hooks 445, 455, 465. The hooks 445, 455, 465 are executables that handle container-specific details of configuring/starting/stopping/deconfiguring the application that relies on the given cartridge type. In one embodiment, to instantiate a cartridge instance in container 400, the node can call the configure hook for the cartridge type requested by the broker. The configure hook call includes the name of the application and any other initial data (e.g., a UUID of the container, a namespace of the container, a name of the application, and, potentially, a location of a sample application to deploy) used in establishing the cartridge instance 440, 450, 460. The configure hook invokes the cartridge library 405 to cause an instance of the indicated type of cartridge to be embedded in container 400.

The cartridge instance 440, 450, 460 is established based on a cartridge package (a software package for a certain software component) maintained in the cartridge library 405. In one embodiment, the cartridge instances 440, 450, 460 are established by copying the cartridge package data into the container 400 space. This includes copying log information, configuration information, handling security constraints, and converting any configuration templates into the actual configuration data for the application and container 400. The cartridge package includes the software (or location to obtain the software) that provides the underlying functionality of the cartridge, as well as all hooks and configuration files that support the underlying functionality of the cartridge. The cartridge instance 440, 450, 460 established in container 400 configures the functionality of the cartridge specific to the application based on the information via the configure hook.

In one exemplary embodiment, a variety of tasks are performed when the configure hook 445 for the JBoss™ cartridge 440 is called for instantiation in container 400. For example, a bash script may run that creates a local JBoss™ AS instance for the application associated with the container 400, which includes a standalone/deployments directory mapped to the application's git repository deployments content. The configure hook may also create the git repository with git hooks to build and restart the server if a source development model is in effect, set up a control shell script that handles the work for the start/stop/restart/status hooks, link log files to a monitoring API 430 of the container 400, update a standalone.xml file with a loopback address assigned to the application, and install HTTP daemon (HTTPD) configuration to proxy an external application URL to the container 400.

Once the cartridge instance 440, 450, 460 is configured, the start hook can be called to start the functionality of the application provided by the cartridge instance 440, 450, 460. The stop hook may be used to stop the functionality provided by the cartridge instance 440, 450, 460.

In some embodiments, the cartridge instances 440, 450, 460 can issue commands to request system information 410 of the application associated with the container 400, such as information about the architecture 412 and packages 414 installed for the application. In addition, the cartridge instances 440, 450, 460 can trigger events 420, such as resource threshold violations, scaling events, notification triggers, and so on. In some embodiments, a monitoring API 430 in container 400 is provided to collect monitoring data generated by each cartridge 440, 450, 460.

Each cartridge instance 440, 450, 460 may also communicate using networking-based connectivity. For example, container 400 is capable of Transmission Control Protocol (TCP)-based communications via standard HTTP/HTTPS 480 and SSH 490 ports established with container 400. Each cartridge instance 440, 450, 460 may bind to these standard ports HTTP/HTTPS and SSH ports 480, 490 when the cartridge instances 440, 450, 460 are embedded in cartridge 400 in order to listen for HTTP/HTTPS or SSH communications directed to the cartridge instances 440, 450, 460. The standard ports 480, 490 for HTTP/HTTPS and SSH may be established for all containers, including container 400, in the multi-tenancy PaaS environment, because theses communication protocols allow for virtual host routing, thus allowing the single port (e.g., 80, 443, 490) to be multiplexed for multiple listeners.

For example, for HTTP/HTTPS communications, ports 80 and 443 are the reserved ports used by the OS of the node to receive this type of traffic. To address the multi-tenants (e.g., containers) that may receive HTTP/HTTPS traffic on a node, the OS contracts with each container hosted by the OS to bind to a user port, such as port 8080, to communicate (receive and send) HTTP/HTTPS traffic. When HTTP/HTTPS traffic is received by the node at ports 80 and 443, the OS of the node handles routing this traffic to port 8080 of the endpoint container 400 that has been bound to receive this traffic. A similar virtual host routing mechanism may be employed for the standard SSH port 490.

In the case of communication protocols that do not support virtual host routing or multiplexing, the use of a public custom port 470 of the container 400 may be implemented. For example, some communication protocols used by data stores (e.g., MySQL, MongoDB, etc.) for data messaging cannot be multiplexed to route traffic to different clients. An example of such a communication protocol may be Performance Co-Pilot (PCP), which has a communication protocol designed to minimize consumption of network bandwidth. In one embodiment, any cartridge instance 440, 450, 460 utilizing a non-standard communication protocol can reserve an exposed custom port 442, 452, 462 of the container 400 to be used by the cartridge instance 440, 450, 460 as a unique port for the custom communication protocol.

These exposed custom ports 442, 452, 462 may be mapped to an ephemeral port of the node OS. For example, in the Linux kernel, the ephemeral ports are ports 32768 to 61000. In one embodiment, each container, such as container 400, created in a node is reserved a limited number of the ephemeral ports. For example, container 500 may be assigned five ephemeral ports 470 of the node OS, such as ports 33001, 33002, 33003, 33004, and 33005. Any of the cartridge instances 440, 450, 460 embedded in container 400 may use the expose port hook to open a connection to one of these ephemeral ports and point the connection to the cartridge instance as a custom port 442, 452, 462. Use of these custom ports provides flexibility to containers and cartridge instances of a multi-tenant PaaS system to support custom protocols, and the ability to adapt to new communication protocols that may be currently unknown to the PaaS system.

In some embodiments, when container 400 hosts more than one cartridge instance 440, 450, 460, the cartridge instances 440, 450, 460 may utilize in-process communication to communicate with each other within the container 400. The custom ports discussed above may facilitate such in-process communication.

Figure 5:
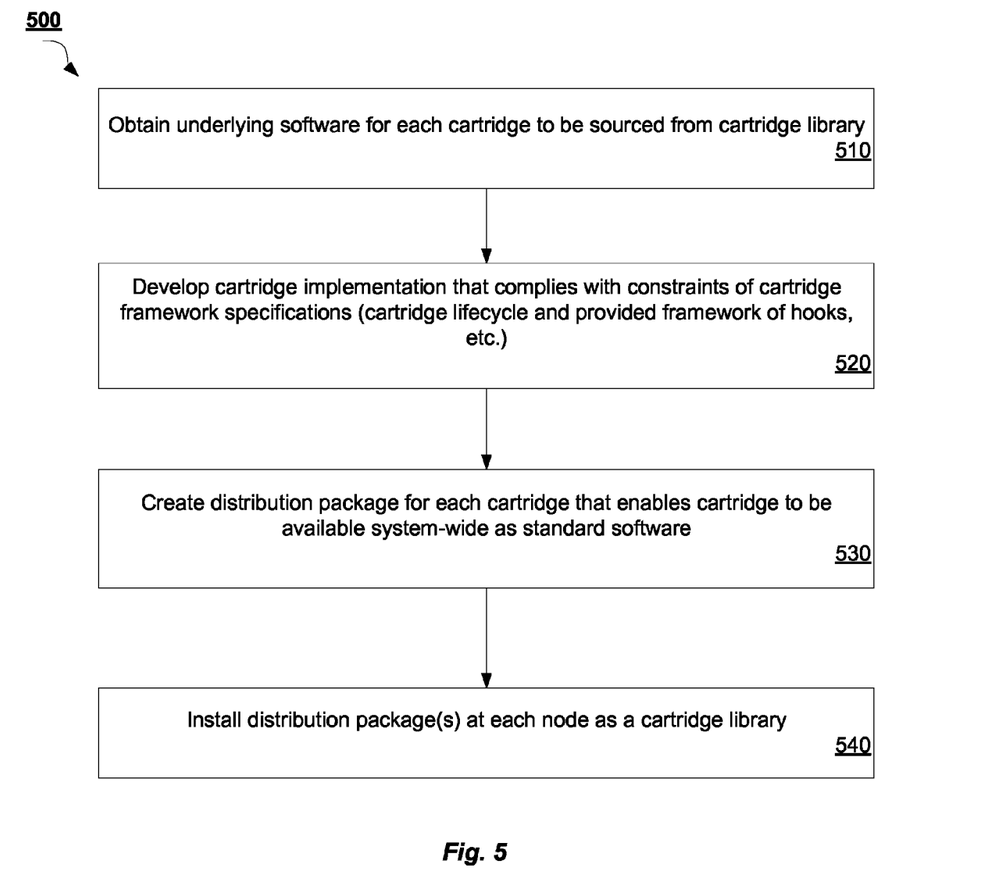
FIG. 5 is a flow diagram illustrating a method for establishing a cartridge library on a node of a multi-tenant PaaS system according to an embodiment of the invention.

FIG. 5 is a flow diagram illustrating a method 500 for establishing a cartridge library on a node of a multi-tenant PaaS system according to an embodiment of the invention. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by a broker layer server orchestration system executing on a computing device, such as server orchestration system 226 described with respect to FIG. 2.

Method 500 begins at block 510 where the server orchestration system obtains underlying software for each cartridge that is to be sourced to nodes in the PaaS system. In one embodiment, obtaining the underlying software include determining a source of distribution that a node can obtain the software from. In some embodiments, a current OS distribution may be the source of cartridge functionality software, and as such, information regarding where to access the software is provided in the cartridge (instead of the software itself). For example, when building a JBoss™ cartridge, the JBoss™ software can be obtained from the RHEL™ OS distribution, instead of separately packaging the JBoss functionality. This distribution sourcing avoids having to package up and maintain the software on the broker layer of the PaaS system. In other embodiment, the cartridge functionality software is packaged and maintained in the cartridge itself.

At block 520, a cartridge implementation is developed for each cartridge to comply with constraints of the PaaS framework specifications. For example, the cartridge implementation is developed to include the hooks that allow the cartridge to be configured, deconfigured, run, stopped, and ports exposed and concealed within a container on a node of the PaaS system. Subsequently, at block 530, the cartridge is bundled in a distribution package to be available as standard software for the PaaS system. In one embodiment, this means putting the cartridge in a format that can be managed and distributed by a package manager. For example, the cartridge may be bundled in an .rpm file format for distribution.

At block 540, the distribution package for each cartridge is installed in a cartridge library at each node of the PaaS system. In one embodiment, all available cartridge packages for the PaaS system are installed at each node. In other embodiments, cartridge packages may be selectively installed at different nodes. In some embodiment, configuration management software, such as Puppet™, may be utilized to distribute the cartridge packages to nodes.

Figure 6:
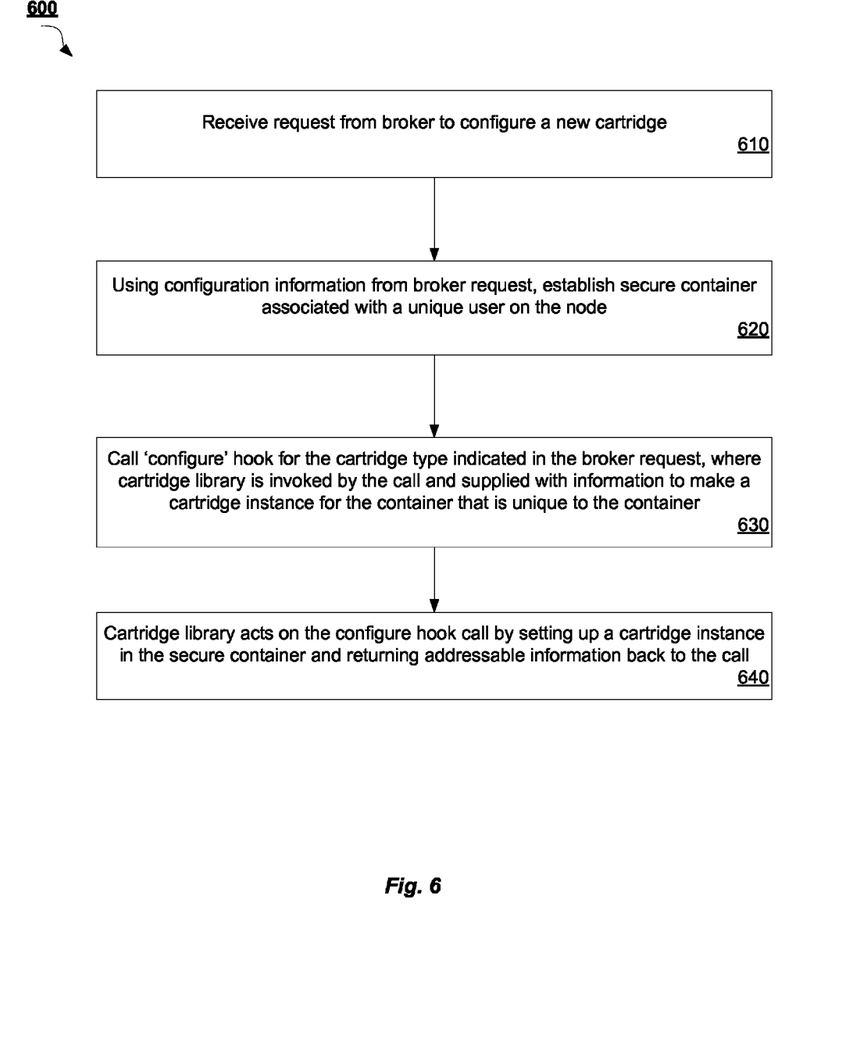
FIG. 6 is a flow diagram illustrating a method for instantiating a cartridge instance on a node according to an embodiment of the invention.

FIG. 6 is a flow diagram illustrating a method 600 for instantiating a cartridge instance on a node according to an embodiment of the invention. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by a node/VM executing on a computing device, such as node 232 described with respect to FIGS. 2 and 3.

Method 600 begins at block 610 where a request is received from a server orchestration system of a broker layer of a PaaS system. The request is to establish and configure a new cartridge on the node. In one embodiment, the request includes a type of cartridge to configure, an action, and parameters such as a name of the application, a namespace/domain of the application, and a UUID for the application.

At block 620, the provided information from the request is utilized to establish a secure container associated with the UUID on the node. Resources boundaries associated with the created container are established by creating directory and file system locations associated with the container and creating a control group associated with the container. Furthermore, security policies for the container are established by creating and applying security labeling and types to the container that fence off the container from other containers on the node and to prevent the container from accessing the underlying system resources of the node, thereby ensuring that applications and/or application components owned by different users can run securely on the same node.

At block 630, the server orchestration system agent invokes a cartridge library on the node to create a cartridge instance of the type of cartridge indicated in the request from the broker. In one embodiment, a configure hook for the cartridge type is called. Subsequently, at block 640, the cartridge library acts on the configure hook call by embedding an instance of the called cartridge type in the established container. In one embodiment, the cartridge instance is copied from a cartridge package maintained in the cartridge library, which includes the software (or location to obtain the software) that provides the underlying functionality of the cartridge, as well as all hooks and configuration files that support the underlying functionality of the cartridge. The cartridge instance established in container then configures and provides functionality for the application.

Figure 7:
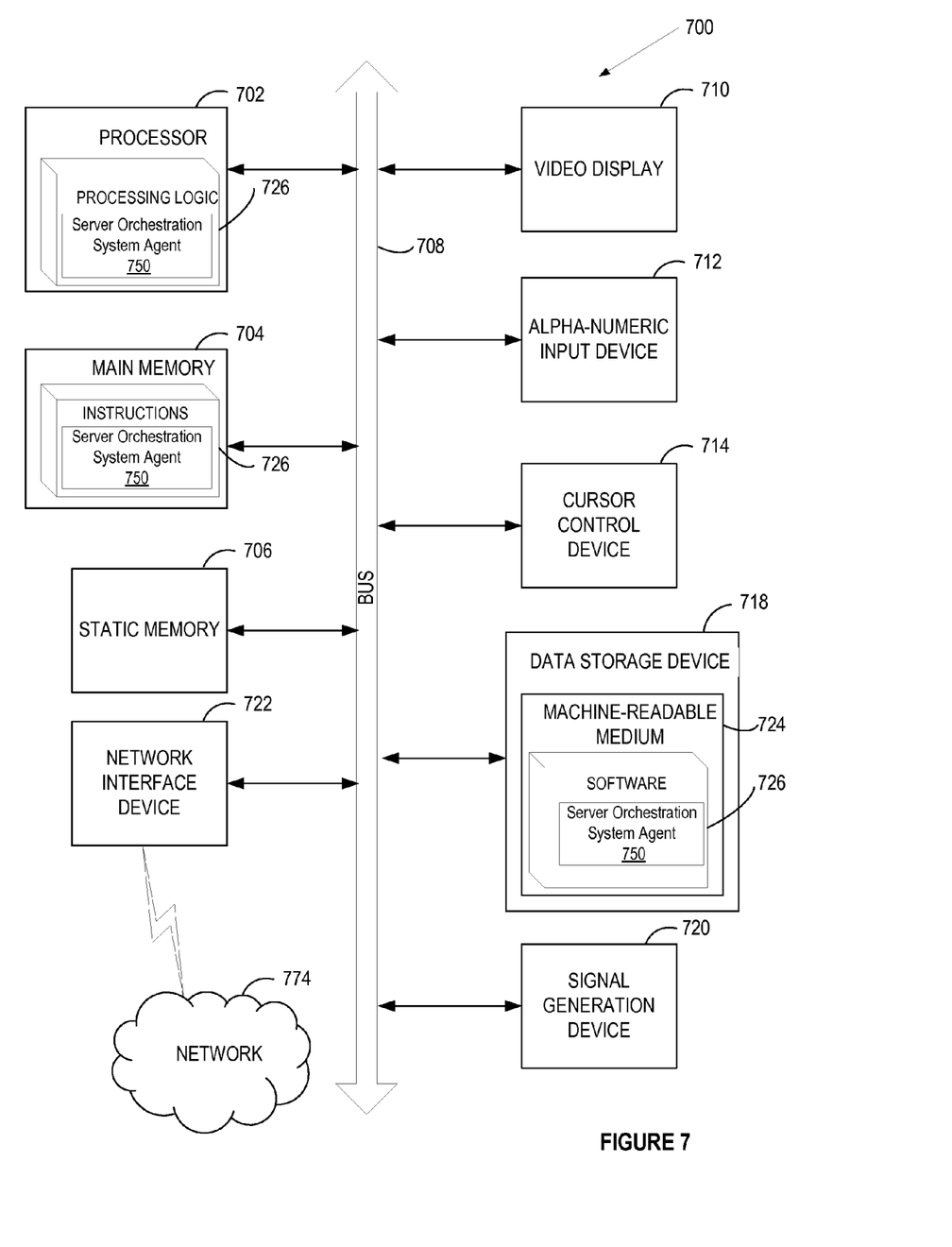
FIG. 7 illustrates a block diagram of one embodiment of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein, illustrated in FIG. 7 by depicting instructions 726 within processor 702.

The computer system 700 may further include a network interface device 722. The computer system 700 also may include a video display unit 710 (e.g., a liquid crystal display (LCD), a cathode ray tube (CRT), or a touchscreen), an alphanumeric input device 712 (e.g., a keyboard), a cursor control device 714 (e.g., a mouse), and a signal generation device 720 (e.g., a speaker).

The data storage device 718 may include a machine-readable storage medium 724 (also known as a computer-readable storage medium) on which is stored software 726 (e.g., one or more sets of instructions, software, etc.) embodying any one or more of the methodologies or functions described herein. The software 726 may also reside, completely or at least partially, within the main memory 704 (e.g., instructions 726) and/or within the processor 702 (e.g., processing logic 726) during execution thereof by the computer system 700, the main memory 704 and the processor 702 also constituting machine-readable storage media. The software 726 may further be transmitted or received over a network 774 via the network interface device 722.

In one embodiment, the software 726 include instructions for a resource server orchestration system agent 750, which may correspond to server orchestration system agent 310 of FIG. 3, and/or a software library containing methods that call the server orchestration system agent for providing containers and cartridge instances in a multi-tenant PaaS environment implemented in a cloud computing system. While the machine-readable storage medium 724 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
maintaining, by a processing device of a node, a repository of a plurality of packages that provide functionality for multi-tenant applications executed by the node, each package of the plurality of packages comprised of a software and a configuration information specifying a plurality of hooks;
receiving, by the node, a request to configure a first package from the plurality of packages, wherein the first package is to provide functionality for one of the multi-tenant applications executed by the node;
establishing, by the node, a container to provide process space for the functionality of the first package;
calling, by the node, a configure hook from the plurality of hooks specified in the configuration information of the first package; and
in response to calling the configure hook, embedding, by the node, an instance of the software of the first package in the container, the instance of the software of the first package copied from the repository of the plurality of packages.

2. The method of claim 1, wherein the plurality of hooks comprise at least one of configure, start, stop, or deconfigure hooks.

3. The method of claim 1, wherein the establishing the container further comprises:
  establishing a unique local user identifier (ID) corresponding to the container;
  establishing resource boundaries for the container; and
  applying security labels to the container to prevent access to processes of the container from other containers on the node.

4. The method of claim 3, wherein the establishing the resource boundaries comprises creating at least one of directories and file system locations associated with the container.

5. The method of claim 1, further comprising calling a deconfigure hook from the plurality of hooks specified in the configuration information of the first package, the deconfigure hook to remove the instance of the software from the container.

6. The method of claim 1, further comprising calling a start hook from the plurality of hooks specified in the configuration information of the first package, the start hook to start execution of the instance of the software in the container.

7. The method of claim 1, further comprising calling a stop hook from the plurality of hooks specified in the configuration information of the first package, the stop hook to stop execution of the instance of the software in the container.

8. The method of claim 1, further comprising:
  receiving, by the node, a request to configure a second package from the plurality of packages, wherein the second package is to provide different functionality for the one of the multi-tenant applications executed by the node;
  calling, by the node, a configure hook from the plurality of hooks specified in the configuration information of the second package; and
  in response to calling the configure hook, embedding, by the node, an instance of the software of the second package in the container, the instance of the software of the second package copied from the repository of the plurality of packages.

9. A system, comprising:
  a memory;
  a processing device operatively coupled to the memory, wherein the processing device is to:
    maintain a repository of a plurality of packages that provide functionality for multi-tenant applications executed by the node, each package of the plurality of packages comprised of a software and a configuration information specifying a plurality of hooks;
    receive a request to configure a first package from the plurality of packages, wherein the first package is to provide functionality for one of the multi-tenant applications executed by the node;
    establish a container to provide process space for the functionality of the first package;
    call a configure hook from the plurality of hooks specified in the configuration information of the first package; and
    in response to calling the configure hook, embed an instance of the software of the first package in the container, the instance of the software of the first package copied from the repository of the plurality of packages.

10. The system of claim 9, wherein the plurality of hooks comprise at least one of configure, start, stop, or deconfigure hooks.

11. The system of claim 9, wherein the processing device to establish the container further comprises the processing device to:
  establish a unique local user identifier (ID) corresponding to the container;
  establish resource boundaries for the container; and
  apply security labels to the container to prevent access to processes of the container from other containers on the node.

12. The system of claim 11, wherein the processing device to establish the resource boundaries further comprises the processing device to create at least one of directories and file system locations associated with the container.

13. The system of claim 9, wherein the processing device is further to call a deconfigure hook from the plurality of hooks specified in the configuration information of the first package, the deconfigure hook to remove the instance of the software from the container.

14. The system of claim 9, wherein the processing device is further to:
  call a start hook from the plurality of hooks specified in the configuration information of the first package, the start hook to start execution of the instance of the software in the container; and
  call a stop hook from the plurality of hooks specified in the configuration information of the first package, the stop hook to stop execution of the instance of the software in the container.

15. The system of claim 9, wherein the processing device is further to:
  receive a request to configure a second package from the plurality of packages, wherein the second package is to provide different functionality for the one of the multi-tenant applications executed by the node;
  call a configure hook from the plurality of hooks specified in the configuration information of the second package; and
  in response to calling the configure hook, embed an instance of the software of the second package in the container, the instance of the software of the second package copied from the repository of the plurality of packages.

16. A non-transitory machine-readable storage medium including instructions that, when accessed by a processing device, cause the processing device to:
  maintain, by the processing device of a node, a repository of a plurality of packages that provide functionality for multi-tenant applications executed by the node, each package of the plurality of packages comprised of a software and a configuration information specifying a plurality of hooks;
  receive, by the node, a request to configure a first package from the plurality of packages, wherein the first package is to provide functionality for one of the multi-tenant applications executed by the node;
  establish, by the node, a container to provide process space for the functionality of the first package;
  call, by the node, a configure hook from the plurality of hooks specified in the configuration information of the first package; and
  in response to calling the configure hook, embed, by the node, an instance of the software of the first package in the container, the instance of the software of the first package copied from the repository of the plurality of packages.

17. The non-transitory machine-readable storage medium of claim 16, wherein the plurality of hooks comprise at least one of configure, start, stop, or deconfigure hooks.

18. The non-transitory machine-readable storage medium of claim 16, wherein to establish the container, the processing device is further to
- establish a unique local user identifier (ID) corresponding to the container;
- establish resource boundaries for the container; and
- apply security labels to the container to prevent access to processes of the container from other containers on the node.

19. The non-transitory machine-readable storage medium of claim 16, wherein the processing device is further to call a deconfigure hook from the plurality of hooks specified in the configuration information of the first package, the deconfigure hook to remove the instance of the software from the container.

20. The non-transitory machine-readable storage medium of claim 16, wherein the processing device is further to:
- receive, by the node, a request to configure a second package from the plurality of packages, wherein the second package is to provide different functionality for the one of the multi-tenant applications executed by the node;
- call, by the node, a configure hook from the plurality of hooks specified in the configuration information of the second package; and
- in response to calling the configure hook, embed, by the node, an instance of the software of the second package in the container, the instance of the software of the second package copied from the repository of the plurality of packages.

* * * * *